United States Patent [19]
Gaffney

[11] Patent Number: 4,846,011
[45] Date of Patent: Jul. 11, 1989

[54] CLUTCH ASSEMBLY

[76] Inventor: Edward J. Gaffney, N26 W27293 Highway SS, Pewaukee, Wis. 53072

[21] Appl. No.: 161,733

[22] Filed: Feb. 29, 1988

[51] Int. Cl.$^4$ ............................................... F16H 57/10
[52] U.S. Cl. .................... 74/424.8 R; 464/30
[58] Field of Search ........................ 192/56 R; 464/30; 74/424.7–425, 84.15

[56] References Cited

U.S. PATENT DOCUMENTS

| | | | |
|---|---|---|---|
| 3,406,583 | 10/1968 | Baier | 464/30 X |
| 3,802,281 | 4/1974 | Clarke | 192/56 R |
| 4,434,677 | 3/1984 | Linley, Jr. | 74/424.8 R X |
| 4,493,478 | 1/1985 | Fortgens | 74/424.8 R X |
| 4,536,112 | 8/1985 | Horsky et al. | 74/424.8 R X |
| 4,588,913 | 5/1986 | Adami | 464/30 X |
| 4,626,112 | 12/1986 | Kramer | 464/30 X |
| 4,747,320 | 5/1988 | Nilsson | 74/424.8 R X |

Primary Examiner—Peter A. Aschenbrenner
Attorney, Agent, or Firm—Fuller, Puerner & Hohenfeldt

[57] ABSTRACT

A slip clutch assembly has a push-pull rod on link and a motor driven threaded lead screw shaft which screws in and out of a threaded bore in the push-pull rod. A plastic generally cylindrical nut is interposed between the lead screw shaft and the bore in the push-pull member. The nut has spaced apart external rings which register in corresponding grooves in the bore in the push-pull rod. The nut has internal threads in which the lead screw turns. If the nut is prevented from moving axially by engaging the push-pull rod with a stop or load the rings on the nut slip on the grooves to prevent overload of the drive system and continued extension of the push-pull rod.

8 Claims, 1 Drawing Sheet

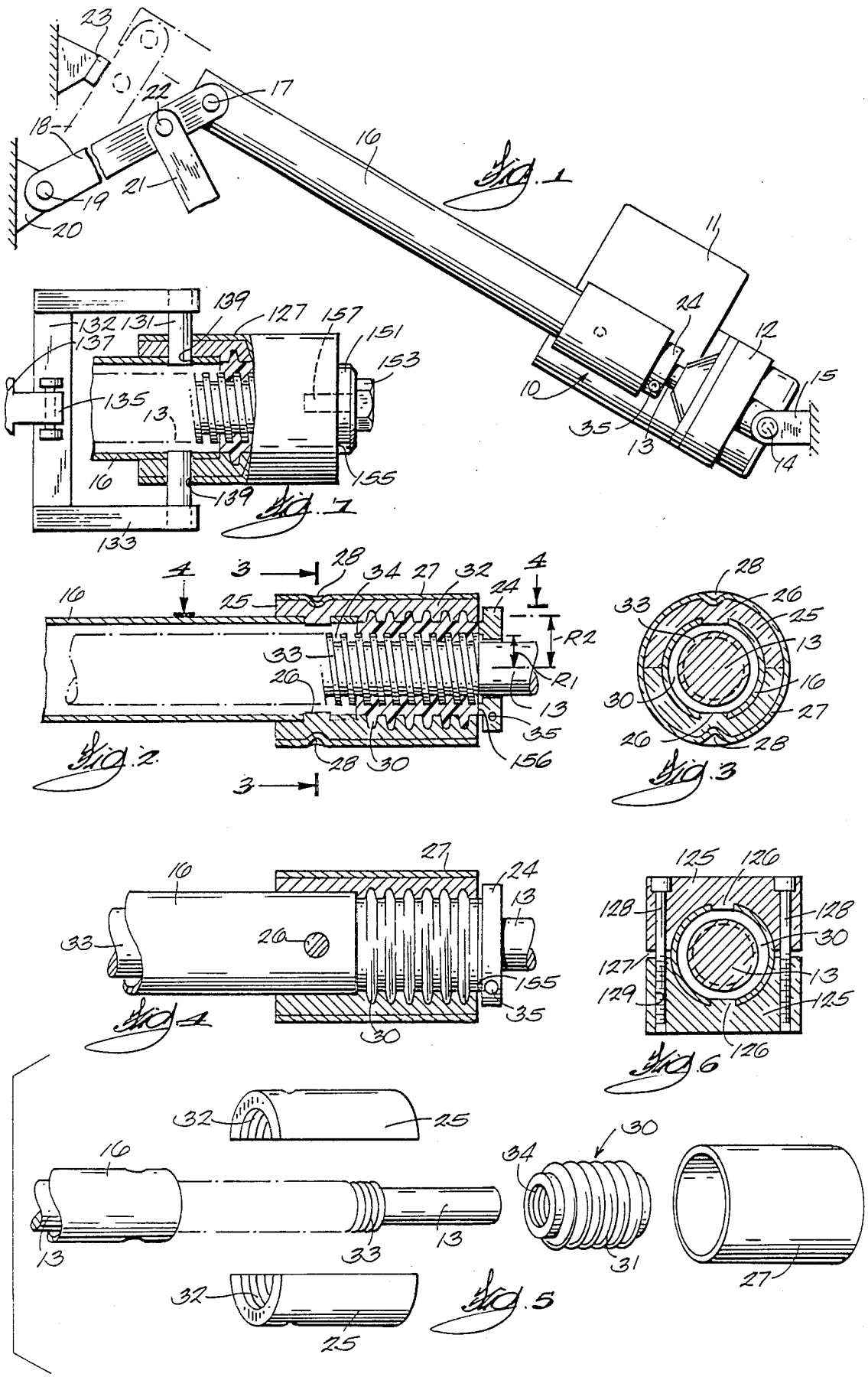

CLUTCH ASSEMBLY

BACKGROUND OF THE INVENTION

This invention relates to a clutch for use with a linear drive screw that will slip when run against a stop as at the end of the screw drive or when linear motion is prevented for any reason.

It is frequently necessary in power drive mechanical systems to limit the amount of travel of a machine element. A widely used method of establishing travel limits for a motor driven machine component is to use electrical limit switches. When the component is caused to travel to its desired limit, the limit switch is tripped open so as to open a circuit in a motor controller which causes the motor to be disconnected from the power lines. In compact mechanical devices it is often difficult to find space to locate limit switches. In any case, it takes time to install limit switches and to wire and connect electric circuits which are incidental to their use.

In some devices in which a machine component is driven until it is physically stopped by running against an abutment, the electrical motor is not deenergized even though its rotor or armature is blocked against rotation. In such cases, motors are used that are designed for tolerating heavy current flow that results from blocking the rotor. This method wastes electricity. Moreover, if the machine component is blocked against travel for a substantial period of time, the motor will continue to draw current and may overheat if it is not disconnected in some other way.

A variety of slip clutches have also been developed for limiting the amount of force that can be transmitted through a motor driven mechanical system if some movable component becomes blocked or the acceptable physical load on the system is exceeded. These prior art slip clutches are very complex as they usually contain a large number of parts such as links, screws, collars, springs, and so forth. Besides being expensive to manufacture and inventory, these prior art clutches are more likely to fail because of their complexity and sensitivity to proper adjustment.

SUMMARY OF THE INVENTION

An objective of the present invention is to provide a slip clutch that can eliminate the need for travel limiting devices such as limit switches and blocked rotor tolerant motors.

A further objective is to provide a slip clutch that has a minimum number of parts, that uses parts that are simple in construction and easy to make, and that is compact and easy to install, and that does not need adjusting devices to carry different loads.

The new clutch is ideal for use in a mechanical system where a pushing or pulling force must be limited or where a pushing or pulling force drives a machine component against a dead stop. The new slip clutch will be described in a linear actuator in which two major parts are basically similar to a screw jack where a screw is turned outward of a body to apply a pushing force in one direction and turned inwardly of the body to apply a pulling force in the other direction. In the new slip clutch, a force relieving element or nut is interposed between the driven lead screw (driving member) and a force transmitting driven member (push-pull link) which element is effective by itself to relieve the driving force if the driven member is blocked against further travel by a stop. The push-pull link has a bore in which there are a plurality of annular grooves. The nut is located in the bore between the annular grooves and the lead screw. This nut has external rings that are shaped complementarily to and are registered in the grooves and slip in the grooves or are rotatable in the grooves when movement of the driven member engages a stop. The nut has a bore that is threaded and in which the threaded lead screw turns. The lead screw, when driven rotationally in one direction, turns into the threaded nut so as to develop a tensile or pulling force between the push-pull link and the lead screw. When the lead screw is turned in the opposite direction, it screws out of the nut, thereby causing the push-pull link to be advanced axially or extended relative to the lead screw so as to develop a pushing force. The friction characteristics between the internal grooves on the push-pull link and the external rings on the nut and between the threads on the lead screw and the external threads on the nut is such that the friction load on the outer rings of the nut is always slightly larger than that of the friction between the nut and the screw thread on the lead screw. Therefore, the lead screw drives the nut and push-pull link axially and the nut is restrained against rotating by the frictional forces between the internal grooves on the push-pull link and the nut. However, when an excess resistive force or stopping force is applied to the push-pull link and the motor driven threaded lead screw shaft continues to turn, the frictional force between the grooves and rings is overcome in which case the nut slips rotationally with respect to the push-pull link grooves so as to stop the linear motion of the push-pull link without overloading the motor. Thus if you grab the push-pull link, linear movement is stopped as the nut slips and rotates in unison with the threaded lead screw.

The theory allowing this action may be stated simply that the total friction of the centerline of the external rings of the nut multiplied by the radius of the rings from the nut centerline must be greater than the total friction at the centerline of the inner threaded part multiplied by the radius of the thread centerline plus the torque required to drive the load. Since the friction force is proportional to the force being driven, the friction at both slipping members (thread and rings) varies with the load being driven, thus no adjustments need be made for varying load requirements.

The slip clutch will work whether the screw turns or the outer portion of the nut assembly is turned.

How the above indicated objectives and other more specific objectives of the new slip clutch assembly are achieved will be more evident in the detailed description of an illustrated embodiment of the invention which will now be set forth in reference to the drawings.

DESCRIPTION OF THE DRAWINGS

FIG. 1 is a side elevation view of a motor driven linear actuator in which the new slip clutch is used;

FIG. 2 is an axial section of the new slip clutch;

FIG. 3 is a transverse section taken on a line corresponding with 3—3 in the FIG. 2;

FIG. 4 is a transverse section taken on a line corresponding with the irregular line 4—4 in FIG. 2;

FIG. 5 is an exploded view of the new slip clutch;

FIG. 6 is an alternative embodiment of the slip clutch; and

FIG. 7 is a sectional view of a further modified embodiment.

DESCRIPTION OF A PREFERRED EMBODIMENT

FIG. 1 shows a motor driven actuator in which the new slip clutch is used and is generally designated by the reference numeral 10. The actuator comprises an electric motor 11 and a speed reducer 12. The output shaft, not shown, of motor 11 is the power input to the speed reducer 12. The power output shaft from the speed reducer is marked 13 and it has lead screw threads 33 on it which will be discussed shortly but are visible in FIGS. 2, 3 and 5. Motor 11 and speed reducer 12 are unitary and are mounted for pivoting about an axis 14 on the bracket 15. This bracket is stationary. It will be evident that the motor and speed reducer and, hence, power output lead screw shaft 13 can swing in a vertical plane on horizontal pivot axis 14. As will be explained subsequently, lead screw shaft 13 which screws into the slip clutch 10 when rotated in one direction and screws out of slip clutch 10 when rotated in the opposite direction thereby produces pulling and pushing forces, respectively. A force transmitting cylinder or push-pull link 16 extends from slip clutch 10. If the thread on shaft 13 is a right hand thread and if it turns counterclockwise as viewed from the right end of the shaft 13 in FIG. 1, the shaft will have a tendency to screw out of the slip clutch 10 but the motion is relative so that what actually happens is that cylinder 16 would be driven to the left and the sum of the lengths of the shaft and the cylinder would increase to produce a pushing force. In the illustrated actuator, cylinder 16 is pivotally connected at 17 to a link 18 which makes a pivot connection at 19 with a stationary bracket 20. A link 21 is shown fragmentarily and it is pivotally connected to link 18 at 22. It will be evident that when tubular cylinder 16 is forced to the left, it will push on link 16 through pivot connection 17 and thereby develop a pulling force on working link 21 which will be in tension if it is connected to some load at its opposite end, not shown. Also, if actuator cylinder 16 is forced to the right, a compressive or pushing force will be developed in link 21. Link 18 is shown in phantom lines where it has been angulated and has been driven against a fixed stop 23. The new slip clutch 10 will now operate to prevent the motor 11 from being overloaded when the actuator is blocked against further travel by stop 23, for example. As will be evident subsequently, a collar 24 on shaft 13 serves as a stop for limiting travel of the actuator in the opposite direction or when a pulling force is being transmitted through cylinder 16.

The new slip clutch is shown by itself in FIGS. 2-5. As can be seen in FIG. 2 particularly well, force transmitting tube or cylinder 16 is secured in the bore of a force transmitting cylindrical member 25. Member 25 is made of metal. In one actual embodiment, aluminum is used but other metals could be used. Member 25 has some radially inwardly extending integral projections 26 which extend through a hole in the thin wall of cylinder 16 to secure force transmitting member 25 to force transmitting cylinder 16. As can be seen in FIGS. 3 and 5, force transmitting member 25 is, in this embodiment, made in two semi-cylindrical parts and they are held together by a keeper sleeve 27 which is made of metal in this example. Wherever there is a radially inward projection 26 on the force transmitting member 25, the keeper sleeve 27 is staked as at 28 to aid in securing the force transmitting member 25 to the cylinder 16.

A non-metallic nut, generally designated by the numeral 30, is located concentrically inside of cylindrical force transmitting member 25. Nut 30 has a plurality of axially spaced apart external rings 31 formed on it. These rings are concentric with the axis of the nut. The rings are annular so that the nut, under certain circumstances, which will be explained, is allowed to rotate about its axis in complementarily shaped annular grooves 32 which are formed in the bore of force transmitting member 25 (FIG. 2). FIGS. 2, and 5 show the axially extending external thread 33 on actuator shaft 13. This thread 33 mates with an internal thread 34 in non-metallic nut 30. Assuming a right hand thread 33 on the shaft 13, clockwise rotation of the shaft as viewed from the right end in FIG. 2 will cause the shaft 13 to screw into the nut 30 to thereby shorten the overall length of the combination of shaft 13 and force transmitting cylinder 16. Conversely, when shaft 13 is rotated counterclockwise, the shaft withdraws from the nut and the overall length of the shaft 13 and force transmitting cylinder 16 increases. When the length is decreased, the upper end at pivot 17 of link 18 is pulled to the right and when the length is increased, pivot axis 17 of link 18 is pushed to the left. It is assumed that some load, not shown, is coupled to link 21 and that it is desirable to set limits for movement of link 21 in both directions. In FIGURE 1, for example, stop 23 is eventually struck by link 18 and this has the effect of limiting travel of link 21 in one direction. The collar 24 on shaft 13 is used for limiting motion of link 21 in the opposite direction, but a stop, not shown, such as the stop 23 could be placed on the opposite side of the link 18 from the stop 23 for arresting motion of link 21 to limit motion incidental to the overall length of the shaft 13 and cylinder 16 being shortened.

The stopping collar 24 on shaft 13 is a split collar which is clamped to the shaft by means of a clamping screw 35. Assume for example that a certain load is imposed on the actuator through link 21. This load is transmitted through the screw thread on shaft 13 by way of internally grooved force transmitting member 25 and nut 30 which intervenes between the force transmitting member and screw thread 33 on shaft 13. The slip clutch is designed so that when a pre-determined load is imposed on it as thus described, the non-metallic nut 30 will not rotate in internally grooved force transmitting member 25 in which case the screw will either push or pull on force transmitting cylinder 16 and thereby extend or contract the combination of the cylinder and shaft as the load is pulled or pushed. Now, if the pre-determined load is exceeded or motion of cylinder 16 is stopped such as by link 18 striking stop 23 in the FIG. 1 illustration of the new slip clutch in a linear actuator, further extension or contraction would be limited in which case non-metallic nut 30 would rotate with shaft lead screw 13 and slip rotationally in the grooves 32 so that no additional force can be transmitted from shaft 13 to force transmitting member 25.

Now, if the combination of force transmitting cylinder 16 and shaft 13 is contracted, which would be the case if the shaft turned clockwise in the nut as viewed from the right end in FIG. 2, the limit of contraction will occur when the end of the force transmitting member 25 and the nut 30 butt up against collar 24 as is the case in FIGS. 1, 2 and 4.

The torque to rotate the shaft 13 consists of the friction between the nut and the rotating screw plus the force required to move the applied load up the screw ramp multiplied by the radius R1 in FIG. 2 of the screw thread. The torque to rotate the nut 30 in force transmitting member 25 consists of total frictional force only multiplied by the outer radius, R2, of the nut. If the coefficient of friction at the outer radius, R2, is equal to the coefficient of friction at the inner radius, R1, the outer radius will not turn if the ratio of the outer radius to the inner radius is greater than the ratio of the thread friction plus load force to the inner thread friction.

There are several commercially available materials that are suitable for making nut 30. A hard variety of nylon is one such material. Nylon with a lubricant such as molybdenum sulphide entrained in it can also be used. In a commercial embodiment, the nut is made of a commercially available plastic material, known by the trademark "Delrin®". The shaft 13 is steel and internally grooved force transmitting member 25 is aluminum, although other metals could be used if desired. The friction coefficients may be different at the two slip surfaces provided the outer ring surface has a higher torsional friction than the inner thread portion.

Experience has shown that when the coefficient of friction of the elements of the new slip clutch is constant and where a part is driven by the actuator until its movement is arrested by striking an immovable stop, the slip clutch can be designed without any provision for making any adjustments. However, slip clutches which are sold to original equipment manufacturers for various uses and for various loads, providing the slip clutch with a means for adjusting and establishing the amount of force that can transmitted before slippage concerns is desirable. FIG. 6 suggests how the slip clutch can be modified for handling various loads or changes in the coefficient of friction because of wear or less lubrication or of unknown friction factors. In this case, the force transmitting member is rectangular in cross section and is made in two similar parts 125. The two halves of the force transmitting member 125 have projections 126 which correspond to the projections 26 in the FIG. 2 that secure the force transmitting member to the force transmitting cylinder 16. The threaded shaft in the FIG. 6 embodiment is marked 13 as it is in the FIG. 2 embodiment because the shafts can be identical. The halves of the force transmitting member 125 are separated by a small gap 127 so as to provide for generating an adjustable clamping force on the plastic nut 30. The adjustable force is obtained by means of a pair of similar screws 128 which pass freely through the upper half of force transmitting member 125 and which have threads 129 at their lower ends for screwing into mating threads in the lower half of the force transmitting member 125.

FIG. 7 shows a modified embodiment with a trunnion mount for the keeper sleeve 127 in which the apertures 139 receive trunnions 131 on mounting bracket 133. Bracket 133 is pivotally connected to a member 137 by a link 135. The member 137 is intended to be moved a pre-selected distance and can be any type of device in which travel in a limited range is desired and in which use of the invention herein can eliminate the need for limit switches to control. A washer 151 supported by a bolt 153 threaded into a bore 157 in shaft 13 serves as a stop. The end face 155 of the threaded shaft 13 engages the washer 151. In the FIG. 2 embodiment an annular rib 156 projects axially from stop collar 124 and interfaces only with the end of the friction nut.

The present invention can be used in a wide variety of devices including lift-recliner chairs such as that shown in U.S. Pat. No. 4,007,960, the entire disclosure of which is incorporated by reference.

Although a non-metallic nut is emphasized, a metallic nut can also be used if it provides the desired action.

I claim:

1. A slip clutch assembly for transmitting a pushing or pulling force, comprising:
   a force transmitting member having a bore in which there are one or more axially adjacent annular grooves concentric to the axis of said bore;
   a cylindrical nut on the external periphery of which there are one or more adjacent ring elements registered in said grooves in said bore, said nut having an axially extending bore concentric with said ring elements and said bore in the nut containing an internal thread;
   a force transmitting lead screw shaft for being driven rotationally and having an axially extending threaded portion engaged with said internal thread of the nut; and wherein rotation of said shaft to cause it to screw in or out of the thread in said nut causing a pulling force and a pushing force, respectively, to be developed on said force transmitting member and said shaft;
   the friction between said force transmitting member and said nut being sufficient to prevent said nut from rotating when less than a predetermined force is applied between said member and said shaft and said nut slipping rotationally and limiting said force when said predetermined force is exceeded.

2. The slip clutch assembly according to claim 1 wherein said nut is composed of plastic.

3. The slip clutch assembly according to claim 1 wherein said nut is composed of plastic including nylon.

4. The slip clutch assembly according to claim 2 wherein said force transmitting member is composed of metal.

5. The slip clutch according to any one of claims 1, 2 or 3 including a stop element fixed on said shaft and operative to stop said threaded portion of said shaft from turning further into said threaded nut so that said nut will slip rotationally in said force transmitting member.

6. The slip clutch assembly according to claim 1 including an elongated tubular force transmitting element having two ends one of which is secured coaxially to said force transmitting member and the other end of which is adapted for being pivotally connected to a load element;
   a reversible electric motor and a speed reducer joined to form a unitary structure, said shaft extending from said speed reducer and driven rotatably thereby; and
   means on said unitary structure for mounting said structure for pivoting in one plane and restraining said shaft against moving axially so that only said tubular force transmitting element can move axially relative, to said shaft.

7. The slip clutch according to claim 1 wherein said force transmitting member is composed of two generally similar half sections containing said grooves and bearing on diametrically opposite sides of said generally cylindrical nut such as to leave a small gap between said sections; and
   adjustable means for pressing said half sections toward each other to control the friction between said nut and said force transmitting member.

8. A slip clutch assembly comprising:

a driven force transmitting member having a cylindrical part and a plurality of annular grooves distributed axially along said cylindrical part, an elongated driving member rotatable about a longitudinal axis and having an axially extending thread arranged coaxially of said cylindrical part, a generally cylindrical frictional nut element arranged concentric to said cylindrical part and to said driving member, said nut element having a plurality of annular rings thereon for registering in and frictionally engaging said grooves and a thread thereon engaged with said thread on the cylindrical part, the friction between said rings and grooves being sufficient to cause said nut element to remain frictionally gripped to said force transmitting member when said driving member is rotated in one direction or the other for its threads to drive said force transmitting member in opposite axial directions when axial movement of said member is resisted by less than a predetermined force and for said frictional grip to be overcome for slippage of said driving member relative to said driven force transmitting member when said predetermined force is exceeded.

* * * * *